(12) United States Patent
Storaasli et al.

(10) Patent No.: US 7,242,830 B2
(45) Date of Patent: Jul. 10, 2007

(54) MICRODUCT CABLE SYSTEM HAVING REDUCED THERMAL EXPANSION FORCE

(75) Inventors: Olaf Storaasli, Hickory, NC (US); Ray Lovie, Hickory, NC (US); Bob J. Overton, Lenoir, NC (US); Jeff Barker, Statesville, NC (US); Charles J. Welnack, Cave Creek, AZ (US); Terry Holshouser, Sr., Lexington, MO (US)

(73) Assignee: Draka Comteo B.V., Amsterdam (NL)

( * ) Notice: Subject to any disclaimer, the term of this patent is extended or adjusted under 35 U.S.C. 154(b) by 0 days.

(21) Appl. No.: 11/476,616

(22) Filed: Jun. 29, 2006

(65) Prior Publication Data

US 2006/0245701 A1    Nov. 2, 2006

Related U.S. Application Data

(62) Division of application No. 10/851,404, filed on May 24, 2004, now Pat. No. 7,095,930.

(60) Provisional application No. 60/487,590, filed on Jul. 17, 2003.

(51) Int. Cl.
*G02B 6/44*    (2006.01)
(52) U.S. Cl. ..................... 385/100; 385/112
(58) Field of Classification Search ......... 385/100–114
See application file for complete search history.

(56) References Cited

U.S. PATENT DOCUMENTS

| | | | |
|---|---|---|---|
| 3,713,947 A | 1/1973 | Hawkins | |
| 4,554,724 A | 11/1985 | Bantz | |
| 4,939,512 A | 7/1990 | Dennison et al. | |
| 5,911,023 A | 6/1999 | Risch et al. | |
| 6,371,691 B1 | 4/2002 | Finzel et al. | |
| 6,484,711 B2 | 11/2002 | Acker et al. | |
| 6,807,355 B2 * | 10/2004 | Dofher | 385/134 |
| 7,050,683 B2 * | 5/2006 | Dofher | 385/100 |
| 2003/0059182 A1 | 3/2003 | Johnson et al. | |
| 2003/0123824 A1 | 7/2003 | Tatarka et al. | |
| 2003/0123935 A1 | 7/2003 | Dofher | |

FOREIGN PATENT DOCUMENTS

| | | |
|---|---|---|
| EP | 0 861 455 B1 | 11/1996 |
| JP | 410148586 A * | 6/1998 |
| JP | 410153495 A * | 6/1998 |

\* cited by examiner

*Primary Examiner*—Quyen Leung
(74) *Attorney, Agent, or Firm*—Sughrue Mion, PLLC

(57) ABSTRACT

A cable system and method including a cable or a microduct provided within the groove extending vertically into, but not through, a pavement. The cable has a central strength member, at least one buffer tube stranded around the central strength member, an outerjacket surrounding the buffer tube and central strength member, and at least one transmission element provided within said at least one buffer tube. Provided within the microduct is a microduct cable including at least one transmission element. A cable including a central strength member, at least one buffer tube stranded around the central strength member, an outer jacket surrounding the buffer tube and central strength member, and at least one transmission element provided within said at least one buffer tube. The cable has a longitudinal thermal expansion force due to a change in temperature from 20° C. to 70° C. of less than 305 lbs when constrained.

14 Claims, 22 Drawing Sheets

MICRODUCT CABLE SYSTEM HAVING REDUCED THERMAL EXPANSION FORCE

This is a divisional of application Ser. No. 10/851,404 filed May 24, 2004, (now U.S. Pat. No. 7,095,930 issued on Aug. 22, 2006) which claims benefit of Provisional Application No. 60/487,590 filed Jul. 17, 2003. The entire disclosure of the prior applications, application Ser. No. 10/851,404 is hereby incorporated by reference.

TECHNICAL FIELD

This invention generally relates to a transmission line cable for use in a groove.

BACKGROUND

Fiber optic cables have been traditionally placed at a depth of 4 to 6 feet below the road surface in a conduit structure that involves excavation, refilling, and repairing of the road surface.

However, fiber optic cables have been recently installed within the pavement of a road in shallow grooves, or channels. These shallow grooves are typically about 2 to 6 inches deep. Fiber optic cables that are provided within a shallow groove in the pavement can be provided to individual customers at a lower cost than cables provided in deeper grooves.

U.S. Pat. No. 6,371,691 ("the '691 patent"), for example, is directed to a method for introducing a micro-cable into a shallow channel in the ground. However, the fiber optic cables of the '691 patent have not been designed specifically for use in the harsh pavement environment. Because shallow groove cables are provided within the pavement, the cables are subject to extreme temperatures caused by the pavement's exposure to the sun. Not only do these extreme temperatures cause the cable to rapidly degrade, but in addition, the high temperatures also can cause the cable to expand linearly.

This expansion can cause the cable to press against the fill material, such as a sealant, provided in the groove above the cables. If the linearly expanding cable pushes against the fill material with a strong enough force, the cable can cause the fill material to push above the road's surface.

SUMMARY OF THE INVENTION

It is, therefore, desirable to provide a groove cable that is able to withstand the high temperatures of pavement yet be installed in a manner that is fast and inexpensive.

According to the invention, a cable system and method includes a cable having a central strength member, at least one buffer tube stranded around the central strength member, an outer jacket surrounding the buffer tube and central strength member, and at least one transmission element provided within said at least one buffer tube; and a pavement having a groove extending vertically into, but not through, the pavement. The cable is provided within the groove.

According to another aspect of the invention, a cable includes a central strength member, at least one buffer tube stranded around the central strength member, an outer jacket surrounding the buffer tube and central strength member, and at least one transmission element provided within said at least one buffer tube. The cable has a longitudinal thermal expansion force due to a change in temperature from 20° C. to 70° C. of less than 305 lbs when constrained.

According to another aspect of the invention, a cable system and method includes a microduct; a microduct cable including at least one transmission element, the microduct cable provided within the microduct; and a pavement having a groove extending vertically into, but not through, the pavement. The microduct is provided within the groove.

BRIEF DESCRIPTION OF THE DRAWINGS

The advantages, nature and various additional features of the invention will appear more fully upon consideration of the illustrative embodiment of the invention which is schematically set forth in the drawings, in which.

DETAILED DESCRIPTION OF THE DRAWINGS

Figure 1:
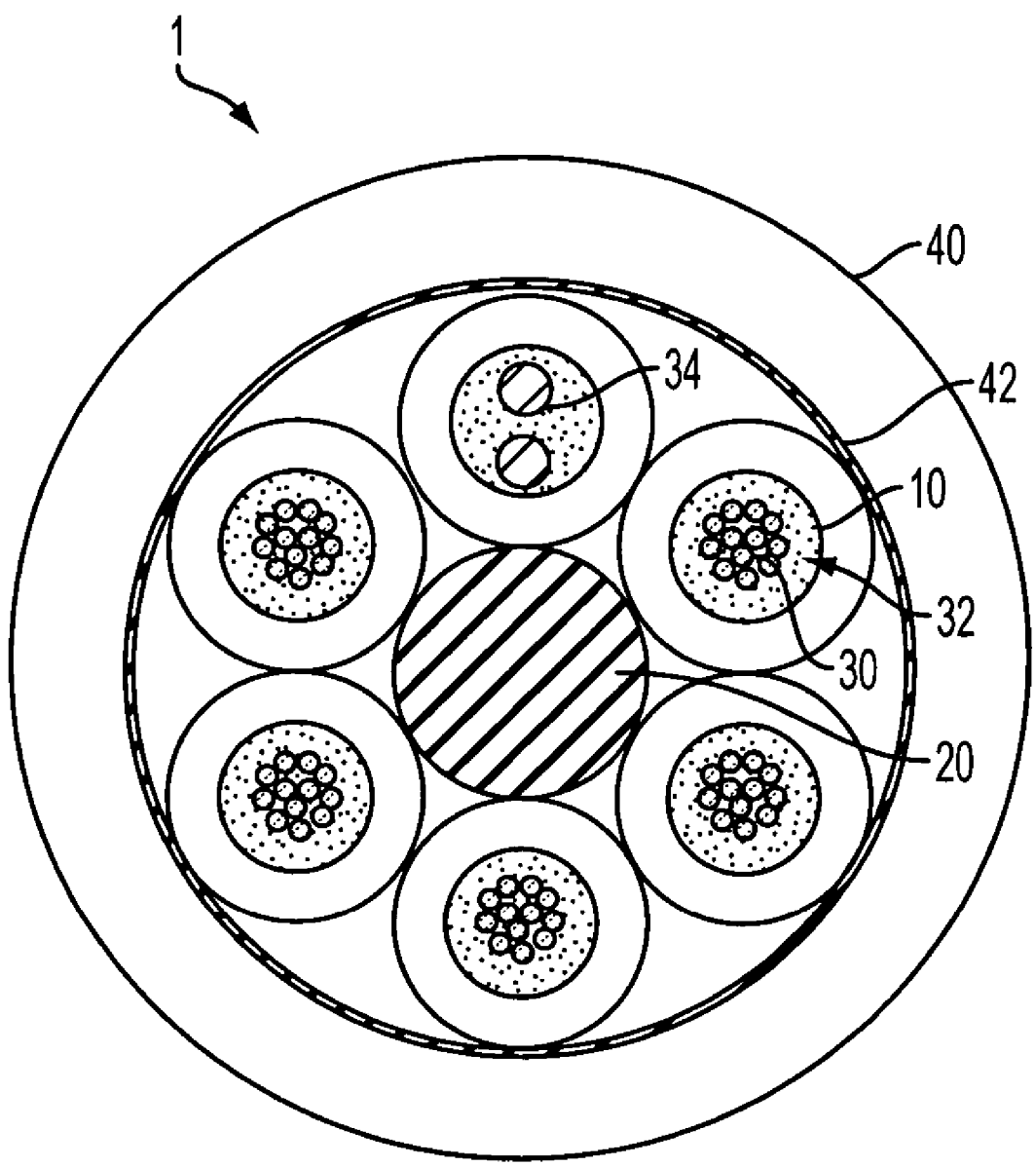
FIG. 1 shows a sectional view of a first embodiment of the groove cable.

While the invention is open to various modifications and alternative forms, specific embodiments thereof are shown by way of examples in the drawings and are described herein in detail. There is no intent to limit the invention to the particular forms disclosed.

FIG. 1 generally shows a first embodiment of a loose tube cable 1 having a central strength member 20, buffer tubes 10 loosely stranded around the central strength member 20, and transmission elements 30 provided within the buffer tubes 10. In addition, a jacket 40 is provided around the buffer tubes 10, a reinforcement layer 42 is provided between the jacket 40 and the buffer tubes 10, and a filling compound 32 is provided within the tubes 10.

Furthermore, one of the buffer tubes 10 can include electrically conductive wires 34, such as copper wires. These wires 34 allow the position of the cable 1 to be determined by sensing a current transmitted through the wires 34.

Figure 2:
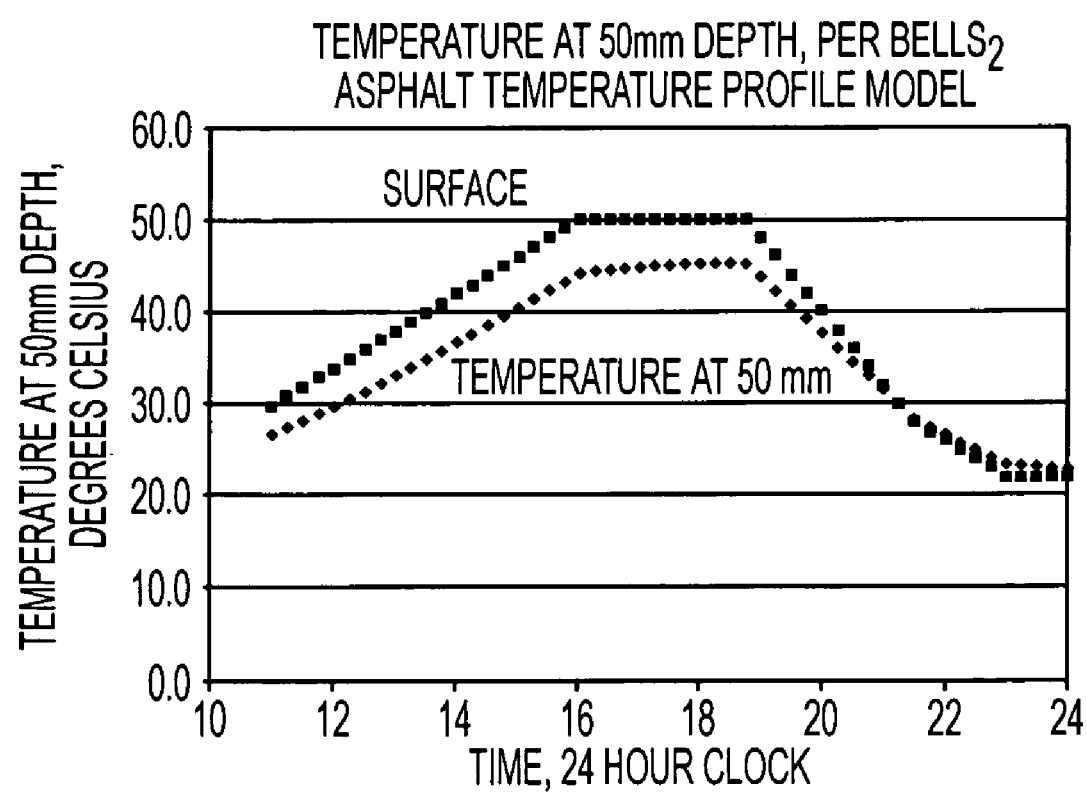
FIG. 2 is a chart which shows estimates of the temperature at 50 mm below the surface of the asphalt compared with temperatures at the surface of the asphalt.

As discussed below, the combination of materials that make up the cable 1 allows the cable 1 to withstand the extreme temperatures of road pavement. As discussed above, pavement that is heated by the sun often is subject to extreme temperature conditions. Not only is the pavement surface heated to a high temperature by the sun, but the high temperature extends below the surface. For example, FIG. 2 is a chart showing an estimate of the temperature at a position 50 mm below the surface of asphalt pavement compared with the temperature at the surface of the pavement according to the BELLs2 asphalt temperature model.

The BELLs2 Asphalt Temperature Model is an accepted tool for estimating the temperature of the pavement during the course of a day. The BELLs2 Asphalt Temperature Model considers air temperature, degree of direct solar radiation, thickness of the pavement, thermal re-irradiation from the surface of the pavement, and other existing factors when calculating the temperature rise of the pavement. On an average sunny summer day the pavement surface temperature can exceed 50° C. On hot days in more tropical climates, the temperature can be much higher.

As temperatures rise, excessive thermal expansion of the cable in the groove generates a buckling force in the cable, since the cable is constrained from expanding linearly by changes in direction of the groove or by termination points. These thermal expansion buckling forces can be large enough to drive the cable up through the pavement in which it resides. By selecting the proper combination of protective plastic materials and rigid strength materials, the thermal expansion and the thermal expansion force of the cable driven by temperature increases is designed to be minimized. Minimizing the thermal expansion and thermal expansion force minimizes the differential strain at the ends of the cable span and the force generated on the sealant when the cable is constrained from expanding. This is accomplished by minimizing the difference between the coefficient of thermal expansion of the overall cable with that of concrete or asphalt, the most common pavement materials. The coefficient of thermal expansion of concrete is typically about 10 μm/m° C., while the coefficient of thermal expansion of asphalt is typically about 40 μm/m° C., as is shown in Table 3, below. A second key criteria is to minimize the effective Young's Modulus of the cable so that for a given cable coefficient of thermal expansion, the resulting thermal expansion force for a constrained cable will be minimized.

In contrast, previous cable designs have not considered the importance of a reduced thermal expansion force generated by the cable. As discussed above in the Background Section, if a cable has a high thermal expansion force, then the cable will buckle and displace the fill material that is positioned above the cable when the pavement is at an elevated temperature.

Although the invention is not limited in this respect, according to the first embodiment the transmission elements 30 are optical fibers 30, such as glass and/or plastic fibers. For example, other transmission elements 30, such as a coaxial cable or other electrical conductors can be used.

The structure of the loose tube cable 1 is preferably optimized to provide the maximum number of transmission elements 30 while still being able to fit within a groove having a small width. According to the first embodiment of the invention, the cable's overall diameter is less than 12.7 mm (0.5 inches). However, the invention is not limited in this respect.

Furthermore, the cable 1 is preferably designed to so that it is capable of bending without fracturing at a bend radius of 4.2 inches. This small bend radius allows the cable to follow the curvature of a road and to be provided with maintenance loops 50 at predetermined locations, which are discussed below.

In order to allow the cable to be bent to a small radius without fracturing, the central strength member 20 has a small diameter and therefore, a small bend strain to avoid fracture of the central member immediately or over time due to fatigue. According to the first embodiment, the central strength member 20 has a diameter of 3.0 mm or less, and a bend strain of less than 1.5% when the cable is placed in a 4.2 inch bend radius.

The limitation of 3.0 mm or less applies to the diameter of the central strength member, excluding any polymer coatings (i.e. polyethylene, polypropylene) which may be applied around the central strength member. However, the invention is not limited in this respect.

Furthermore, according to the first embodiment, the buffer tubes 10 are stranded around the central strength member 20 in a reverse oscillated pattern, but the invention is not limited in this respect. The laylength (e.g., distance required to complete one revolution of the strand around the diameter of the central strength member 20) of the buffer tubes 10 of the first embodiment is preferably between 40 and 130 mm. This structure allows the transmission element 30 strain inside the buffer tube 10 to be maintained at 0.2% or less both when the cable is in a straight position and when the cable it bent to a small bend radius of 4.2 inches.

In contrast to the first embodiment, previous shallow groove cables have had a single tube provided with optical fibers. However, having a loose tube cable 1 with buffer tubes 10 allows the transmission elements 30 within a buffer tube 10 of the loose tube cable 1 to extend away from the rest of the cable 1 as a lateral take-off, or drop, to a location, such as an office property, without having to sever and splice the other fibers in the cable.

Although the invention is not limited to the specific material of the cable, some exemplary materials that can be used with the first embodiment are discussed below.

The central strength member 20 can be a dielectric material. For example, the central strength member 20 can be made of a glass reinforced plastic composite ("GRP"), such as the LIGHTLINE; manufactured by NEPTCO, or the GRP manufactured by FIBERLINE-COUSIN. However, the central strength member 20 is not limited to dielectric materials. For example, the central strength member 20 can also made of a metal, such as steel as long as the bend strain of the member 20 does not exceed the yield stress of the metal when the member 20 is bent to a radius of 4.2 inches. The yield stress of a high strength steel is typically 200 to 300 kpsi.

The material used for the buffer tubes 10 can be, for example, Polybutylene Terephthalate ("PBT") or Polypropylene ("PP"). One example of a suitable PP is a nucleated ethylene-polypropylene copolymer, which is manufactured by EXXON as ESCORENE PP 7032 KN and is manufactured by AMOCO as ACCTUF 10-3243. Furthermore, a nucleated, semi-crystalline Polyolefin can also be used.

In addition, according to the first embodiment, the reinforcement layer 42 includes fiberglass composite yarns ("glass"), such as HERKUFLEX manufactured by PPG. Furthermore, the jacket can be made of a high-density polyethylene ("HDPE"), such as DHDA 6318 BK manufactured by Dow Chemical Co. The filling compound 32 is generally a water blocking material, such as a gel. Alternatively, a super-absorbent polymer, such a poly-sodium acrylate, in powder form or attached to a carrier element may be used to block the ingress of water.

According to a second embodiment of the invention, instead of the loose tube cable 1, a microduct cable is provided within a microduct. The microduct may be made of a material similar to the jacket material discussed above. The microduct is provided within the shallow groove.

A microduct is a tube that is used house a microduct cable for point-to-point applications. The microduct can be installed within the pavement before the cable having transmission elements is placed within the microduct, or the microduct cable can be included within the microduct at the time of installation.

There are several benefits of installing a microduct and microduct cable into the groove in lieu of a loose tube groove cable. First, the microduct cable can be more easily removed from the pavement than the loose tube groove cable in the event cable removal is desirable. For example, it may be necessary to repair or upgrade the capacity or performance of the cable. In addition, the microduct/microduct cable solution allows the deferral of capital cost of the cable until the need for transmission occurs. An example of such deferred capital investment is where an operator is installing a groove cable access network but expects the number of customers for transmission to increase progressively over time. In this case, the network of microducts can be installed in the grooves during the initial installation and then microduct cables installed into the microducts in the future as customers/subscribers are obtained. Like the loose tube cable 1, discussed above, the microduct and microduct cable must also be able to withstand the pavement's high temperatures.

Cable Resistance to Temperature

Only buffer tube materials that can withstand degradation when subject to high temperatures should be used in shallow grooves within the pavement. For example, although PBT is a commonly used buffer tube material, grades of PBT that are ordinarily used are only moderately stabilized against hydrolytic degradation of the material, which is a mechanism greatly accelerated by high temperature in the presence of moisture.

Figure 3:
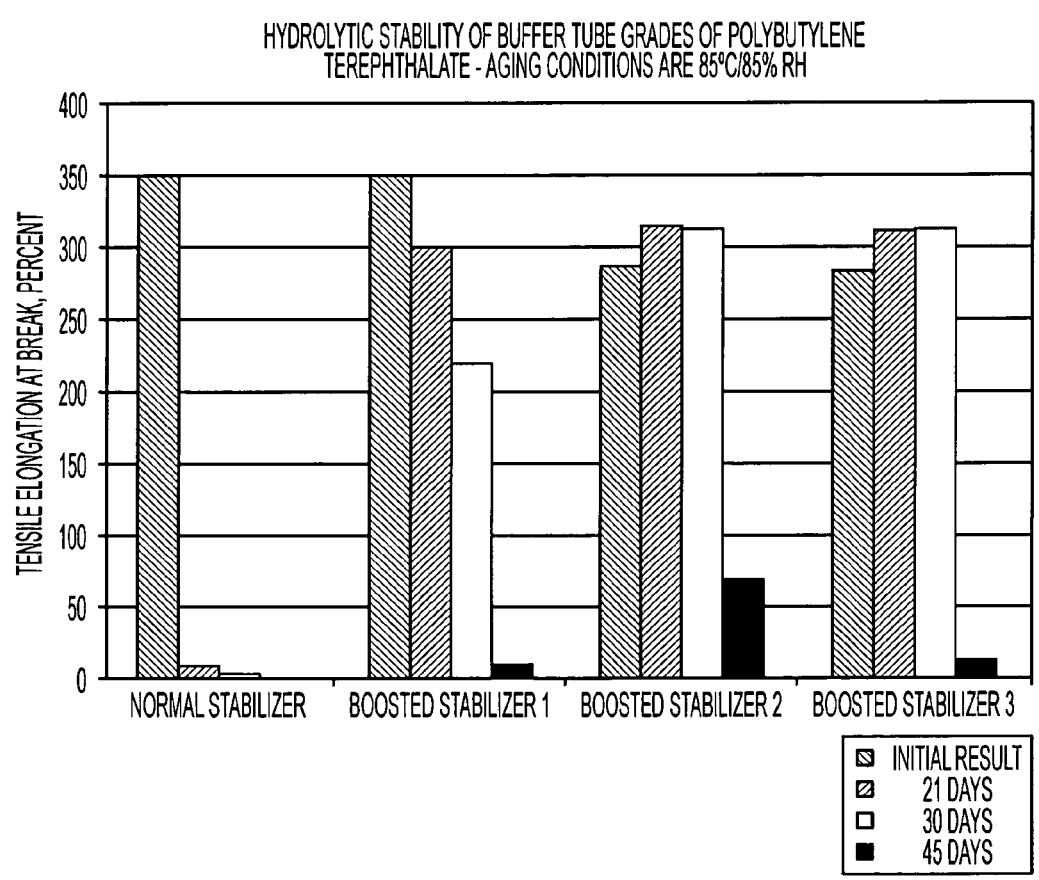
FIG. 3 is a graph that compares the resistance to mechanical breakdown under accelerated aging of several boosted-stabilizer Polybutylene Terephthalate ("PBT") buffer materials with ordinary commercial PBT.

Strengthened stabilizer systems for PBT have been developed and applied in this invention to protect the material against hydrolysis. FIG. 3 shows the resistance to mechanical breakdown under accelerated aging of several boosted-stabilizer PBT's compared with ordinary commercial PBT. PBT grades suitable for fabricating fiber optic buffer tubes exhibit ultimate strain levels of 250 percent or higher before exposure to aggressive environments. With most commercial grades of PBT, the result of the hydrolytic breakdown of the polymer structure during 45 days of aging at 85° C./85% RH is a drastic loss of ultimate strain or elongation at break, the ultimate strain falling to <20 percent within the first 21 days of aging and to less than 5 percent after 45 days aging. Generally, the danger of fracture due to buffer tube embrittlement is significant if the ultimate elongation of the tube material is less than 5 percent. The boosted-stabilizer PBT's can maintain ultimate strain levels of greater than 100 percent and greater than 10 percent at 30 days and 45 days aging, respectively. More preferably, suitable choices for the stabilizer package provide for ultimate strains of greater than 200 percent and greater than 20 percent at 30 days and 45 days aging, respectively. Most preferably, the boosted-stabilizer package can provide for the retention of ultimate strain at greater than 300 percent and greater 50 percent after 30 days and 45 days aging, respectively. The invention is not limited to these particular ratios of ultimate strain retained after 30 days and 45 days aging, but these ratios illustrate and generally define the effects of the boosted-stabilizer on the ultimate properties of the PBT material. The importance is that if it becomes necessary to access the cable after a significant period of service in the frequently-hot pavement and there has been an accelerated hydrolytic breakdown of the buffer tube material, handling the cable, especially in the coiled slack loops, risks rupturing the buffer tubes if the boosted-stabilizer PBT is not used.

Impact-modified polypropylene ("iPP") can also used be in optical fiber cable buffer tubes. While polypropylene is not attacked by moisture, high temperatures can render the ordinarily used grades of iPP vulnerable to oxidative degradation. Therefore, boosted stabilizer iPP systems have been developed.

The widely-used measure of the buffer tube material's degradation when subjected to high temperatures is the oxidation induction time ("OIT") test. Oxidation induction time for optical fiber buffer tubes is generally measured at 200° C. During the oxidation induction time test, a small sample of the tested material is placed in a differential scanning calorimeter. A differential scanning calorimeter is a device that measures the energy necessary to maintain the sample at some temperature.

During the test, first, the sample under an inert (nitrogen) atmosphere is taken to 200° C., and then the testing atmosphere is changed to pure oxygen. The energy input to the sample to keep it at 200° C. is monitored during the test.

When the stabilizers are consumed, the sample begins to oxidize and generates its own heat, so less energy is required to keep it at 200° C. When this occurs, the monitoring instrument registers an exotherm, which is a release of energy from the chemical reaction of oxidation.

Figure 4:
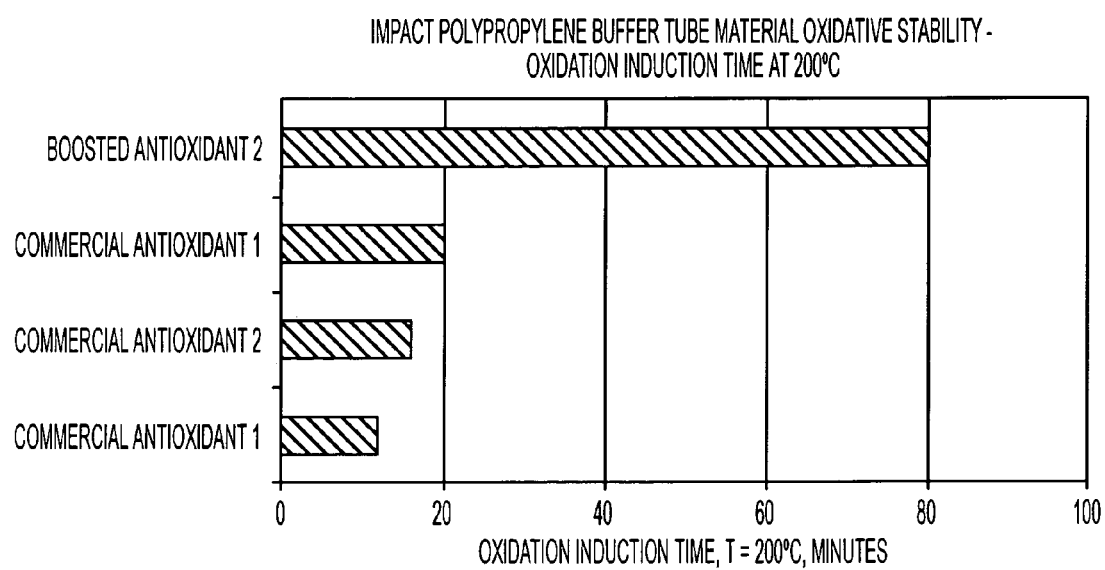
FIG. 4 is a graph that compares the oxidation induction time ("OIT") of boosted buffer materials with that of normal commercial materials.

The measured OIT is the time from when the sample temperature first reaches 200° C. to the beginning of the exotherm. Most commercial iPP's exhibit OIT's of 30 minutes or less at 200° C. However, the buffer tube materials of this invention have been boosted to greater than 60 minutes OIT at 200° C. FIG. 4 shows a comparison of the OIT of boosted materials suitable for this invention compared with that of normal commercial materials.

Figure 5:
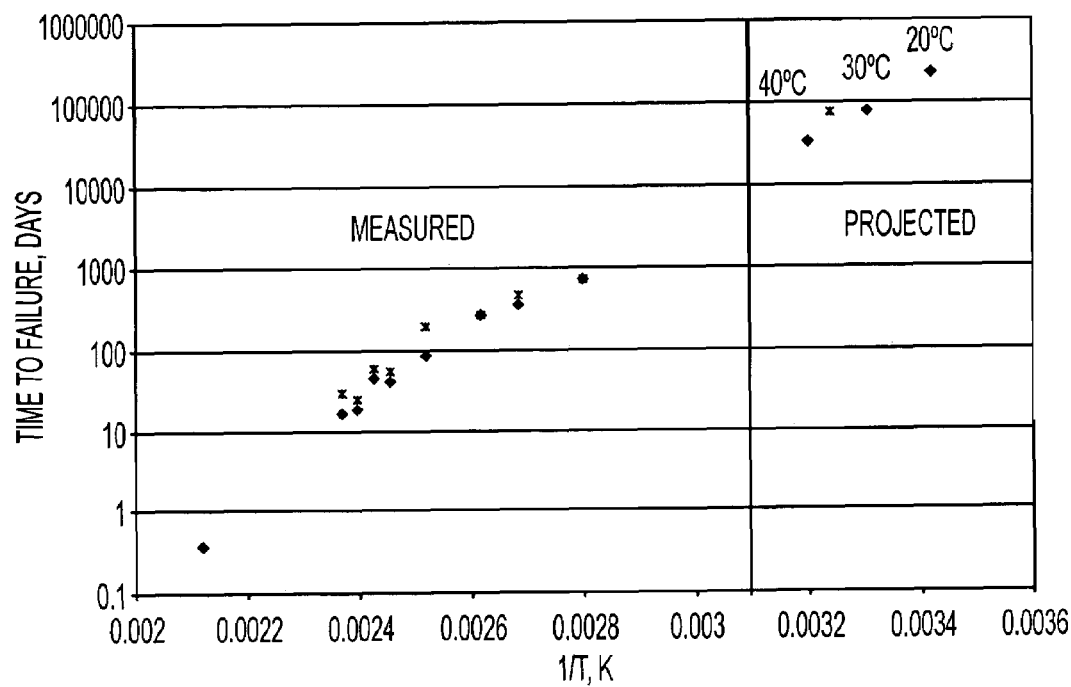
FIG. 5 is an Arrhenius projection of the lifetime of an impact-modified Polypropylene ("iPP") buffer material with booster stabilizers.

Furthermore, FIG. 5 is an Arrhenius projection of the lifetime of iPP with booster stabilizers. Using the breakdown in mechanical properties as the criterion for failure of the iPP, an Arrhenius regression for variously aged specimens of the iPP with boosted stabilizers demonstrates that the buffer tubes have a projected lifetime of over 30 years even if subjected to a constant temperature of 50° C. for the entire period.

Furthermore, in order to reduce the possibility of the jacket 40 (first embodiment) or microduct (second embodiment), hereinafter ("duct material") being damaged should the hot sealant fill material come into contact with the cable during the sealing of the groove, the duct material should be made of a material that is able to withstand a temperature of 180° C. Some examples of materials that can provide this type of resistance are a material with a melt point above 180° C., preferably 200° C., or a cross-linked material.

In contrast, commonly available duct materials are manufactured with melt temperatures of about 120° C.+/−20° C.

These duct materials can be easily damaged in locations where the hot sealant comes into contact with the jacket material.

In order to examine the potential damage to the expected lifetime of the cable core materials that would be caused by exposure to the heat of molten sealant poured in the groove following the cable installation, samples of the cable design were prepared with a thermocouple inserted at the first layer of buffer tubes 10 of the first embodiment. The samples were then placed in a channel simulating a groove having a width of 1.25 inch and depth of 2.5 inch so that the cable sample was exposed to more molten sealant than a cable would be exposed to during actual conditions of sealing a groove.

The sealant was heated to the recommended temperature of 180° C. and then poured over the cable samples. The buffer tube temperature was monitored until the cable sample's temperature returned toward ambient temperature.

Figure 6:
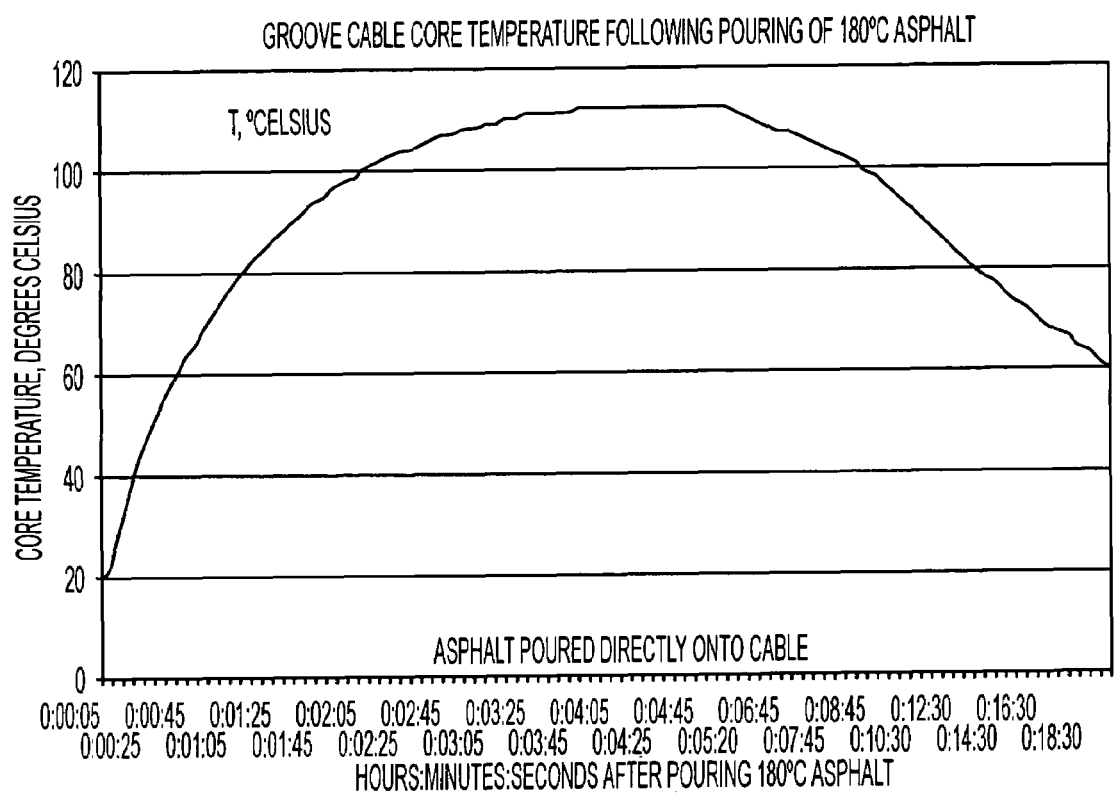
FIG. 6 shows the results of a test to examine the potential damage to buffer tubes caused by exposure to the heat of molten sealant poured into the groove following the cable installation.

FIG. 6 shows the results of this test. It is noted that the maximum temperature reached is about 110° C., and that the total time spent at elevated temperature due to the pouring of molten sealant is very short, and as such has an insignificant impact on cable lifetime with the proper choice of component materials.

In view of the extreme temperature conditions to which the buffer tube material is exposed, the material of the buffer tubes 10 should have an OIT of greater than 60 minutes at 200° C. in a 100% oxygen environment. Using a buffer tube material with an OIT greater than 60 minutes ensures that the cable is reliable even when it is subjected to high temperatures and high humidity, such as for example 55° C. with a humidity of 80%.

Cable Thermal Expansion Force

In addition, a cable with a minimized thermal expansion force is suitable for use in a shallow groove within, but not extending through a pavement. Cables generally elongate as the temperature rises and contract as the temperature falls. The amount of elongation or contraction of the cable is proportional to the degree of temperature change, generalized for example as from T1 to T2, and to the coefficient of thermal expansion ("CTE") of the cable structure.

$$\text{Elongation/contraction} = CTE \times (T1-T2) \quad (1)$$

Since a cable is a composite of many different materials (plastics, strength materials, anti-buckling materials), the CTE of the entire cable depends on the combination of the individual properties and relative amounts of each component material, and is calculated using a rule-of-mixtures.

$$CTE = \text{sum of } (A \times E \times a)/\text{sum of } (A \times E) \quad (2)$$

where: A is the cross sectional area of each material in the cable (sq inches);

E is the elastic modulus of each material in the cable (lb/sq inch); and a is the coefficient of expansion of each of the materials (1/deg F.).

It is noted that because the latter two properties, E and a, are themselves dependent on the temperature of the material, the cable CTE is not one number, but varies with the temperature. Numerical integration techniques are used to determine the cable CTE as a function of temperature and, as such, the amount of cable elongation or contraction that occurs between two chosen temperature limits.

Table 1 below shows typical values for material modulus (E), at different temperatures:

TABLE 1

| Material | Material Modulus (E) (psi) at −40° F. | Material Modulus (E) (psi) at 70° F. | Material Modulus (E) (psi) at 160° F. |
|---|---|---|---|
| Glass Reinforced Plastic (GRP) | $7.2 \times 10^6$ | $7.2 \times 10^6$ | $7.2 \times 10^6$ |
| Polypropylene | 378,000 | 238,000 | 154,000 |
| Glass | $10.3 \times 10^6$ | $10.3 \times 10^6$ | $10.3 \times 10^6$ |
| High Density Polyethylene (HDPE) | 367,000 | 175,000 | 45,300 |

Table 2, below shows typical values for coefficient of expansion (a), at different temperatures.

TABLE 2

| Material | Coefficient of Expansion (a) (1/° F.) at −40° F. | Coefficient of Expansion (a) (1/° F.) at 160° F. |
|---|---|---|
| Glass Reinforced Plastic (GRP) | $3.3 \times 10^{-6}$ | $3.3 \times 10^{-6}$ |
| Polypropylene | $12 \times 10^{-6}$ | $69 \times 10^{-6}$ |
| Glass | $5.5 \times 10^{-7}$ | $5.5 \times 10^{-7}$ |
| High Density Polyethylene (HDPE) | $36 \times 10^{-6}$ | $146 \times 10^{-6}$ |

The cable expansion or contraction is calculated using equation 1. As the cable expands or contracts, it exerts a push or pull force on anything that restricts its movement. The push or pull force is calculated according to the following equation:

$$F = \text{elongation or contraction} \times \text{sum of } (E \times A) \quad (3a)$$

By substituting equation 1 into this equation, the equation becomes:

$$F = CTE \times (T1-T2) \times \text{sum of } (E \times A) \quad (3b)$$

where: F is the push/pull force;

CTE is the composite coefficient of thermal expansion of the cable from equation 2;

(T1−T2) is the temperature difference; and sum of (E×A) is the sum of the modulus times the cross sectional area of each cable component.

If the cable materials have a high modulus, then even though the cable might have a relatively low amount of elongation or contraction due to having a low CTE, the cable may have a high push/pull force F. Therefore, the change in dimension of such a cable is not easily resisted or restricted.

Furthermore, if a cable material has a low modulus, even though the cable might have a relatively high amount of elongation or contraction due to having a high CTE, the cable would have a low push/pull force F. The change in dimension of this type of cable is easily resisted or restricted.

Table 3, below shows a comparison of the CTE of an embodiment of the loose tube cable 1 and microduct/microduct cable of the present invention compared with the CTE of the cable of the '691 patent and typical pavement materials. While the values listed for the cable 1 and microduct cable have been correlated with actual testing, the values for the cable of the '691 and the microduct (standard HDPE) are theoretical values that have not been experimentally verified.

TABLE 3

| Material | Coefficient of Thermal Expansion (μm/m ° C.) |
| --- | --- |
| '691 patent cable | 19 |
| Loose tube cable | 13 |
| HDPE Duct | 140 |
| Microduct Cable | 9 |
| Asphalt | 40 |
| Concrete | 10 |

The CTE values of Table 3 assume relative "free expansion" of the different items. "Free expansion" means that item has been placed on a frictionless surface without any restrictions from freely expanding in the longitudinal direction.

Figure 7A:
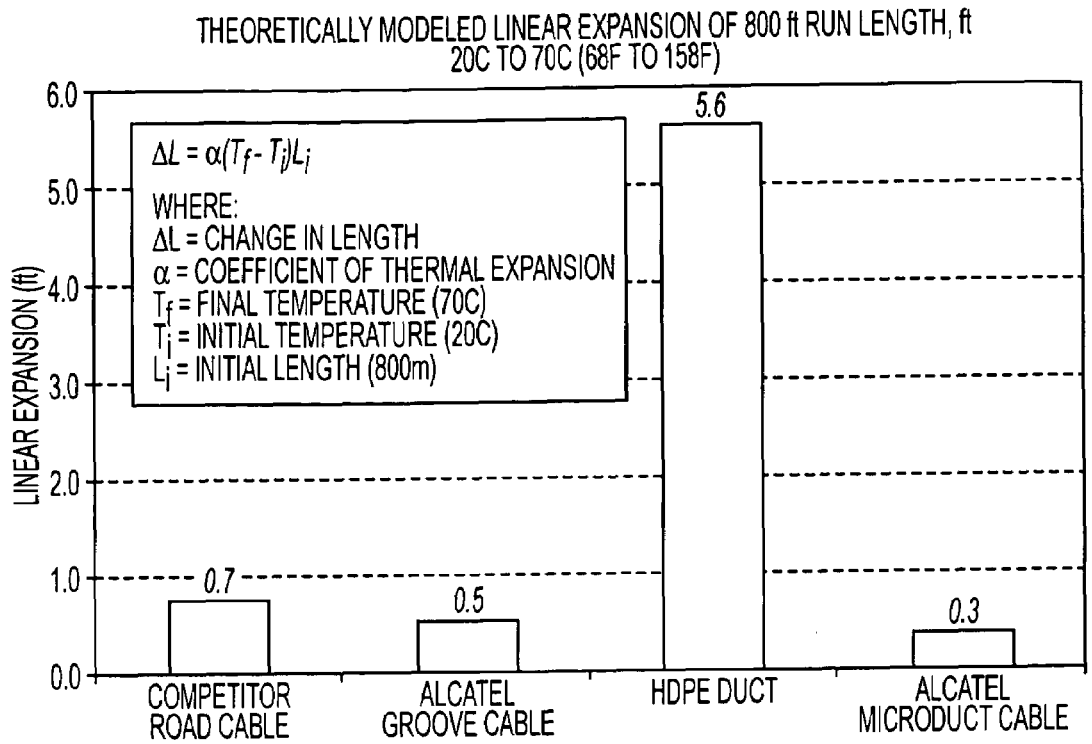
FIG. 7A shows theoretically modeled "free" linear expansion values for an 800 ft. length of the cable items.

FIG. 7A shows the theoretically modeled "free" linear expansion of an 800 ft. length of the cable items listed in Table 1. The values shown in FIG. 7A assume that the items were placed on a frictionless surface on a moderate day, i.e., 20° C. (68° F.), and then heated to a temperature of 70° C. (158° F.). It is notable that because the microduct (HDPE duct) is exclusively a polymer, it is the item that is the most sensitive to temperature fluctuations and expands the most. In contrast, the '691 cable and the loose tube cable 1 resist thermal expansion because they have rigid component members with relatively low coefficients of thermal expansions, respectively.

The linear expansion of an 800 ft. run length due to a change in temperature from 20° C. to 70° C. of the loose tube cable 1 of the first embodiment should be less than the 0.7 ft. of the cable of the '691 patent. In addition it is preferable that the linear expansion of an 800 ft. run length of the loose tube cable 1 of the first embodiment, due to a change in temperature from 20° C. to 70° C., is less than or equal to 0.5 ft. Furthermore, the linear expansion of an 800 ft. run length of the microduct (HDPE duct) of the second embodiment, due to a change in temperature from 20° C. to 70° C., should be less than or equal to 5.6 ft. In addition, it is preferable that the linear expansion of an 800 ft. run length of the microduct cable of the first embodiment, due to a change in temperature from 20° C. to 70° C., is less than or equal to 0.3 ft.

However, a more realistic model of the effect of temperature on the items is based on a comparison of the linear expansion force of each item. The linear expansion force takes into account the axial stiffness of each item and the longitudinal force exerted as the item is heated. When a cable and/or a duct is installed in a groove, the movement of the cable is restricted in all directions.

Lengthwise, the restriction may be the ends of the groove, 90 degree turns of the groove, or cable termination housings. On three sides around the cable, the road pavement restricts the cable and/or duct. However, one or more backing rods and a filling material, or sealant, are the only restrictions on the top side of the cable and/or duct. Strongly restricted from expanding strictly lengthwise in a straight line, the cable will buckle in the direction of least resistance. Since the backing rods and sealant are the weakest restrictions, the backing rods and sealant give way if the expansion force is too strong.

Figure 7B:
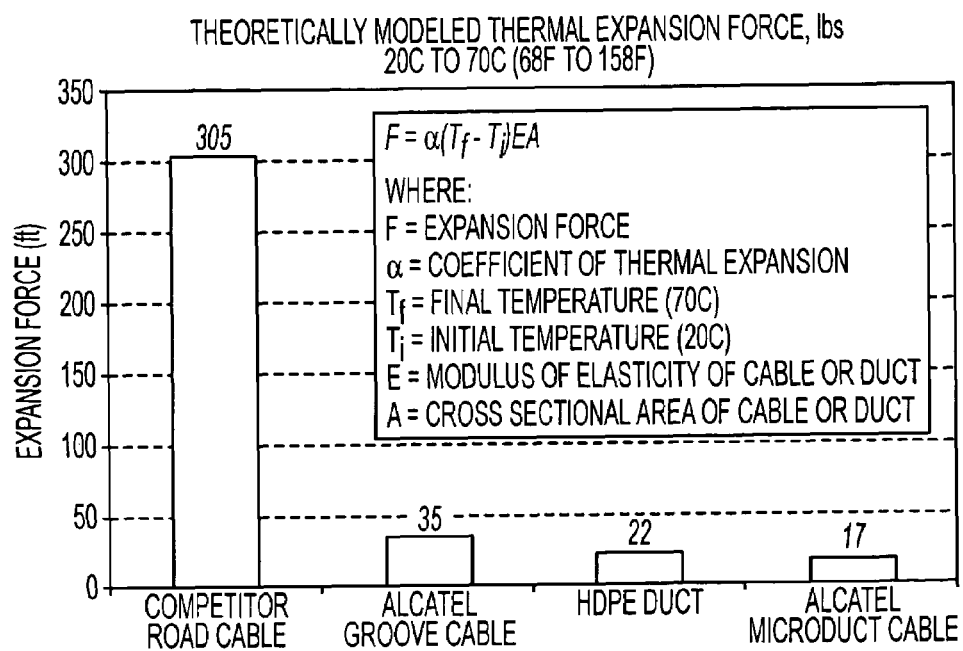
FIG. 7B shows theoretically modeled longitudinal thermal expansion force values for certain cable items.

FIG. 7B shows the theoretically modeled longitudinal thermal expansion force of the cable items listed in Table 1. It is notable that, although the longitudinal thermal expansion force is not dependent on the length of the items, according to buckling theory an item with a greater length will buckle more readily than an item with a smaller length. This buckling has been observed for portions of long lengths of the cable of the '691 patent, which tend to push out of the groove.

As shown in FIG. 7B, the thermal expansion force in pounds due to a change in temperature from 20° C. to 70° C. of the loose tube cable 1 of the first embodiment should be less than the 305 lbs. of the cable of the '691 patent. In addition, it is preferable that the thermal expansion force in pounds due to a change in temperature from 20° C. to 70° C. of the loose tube cable 1 of the first embodiment is less than or equal to 35 lbs. Furthermore, the thermal expansion force in pounds due to a change in temperature from 20° C. to 70° C. the microduct (HDPE duct) of the second embodiment should be less than or equal to 22 lbs. In addition, it is preferable that the thermal expansion force in pounds due to a change in temperature from 20° C. to 70° C. of the microduct cable of the first embodiment is less than or equal to 17 lbs.

Installation Method

A method of installing the cable 1 of the first embodiment within a groove 60 within the pavement 50 is described below.

Figure 8A:
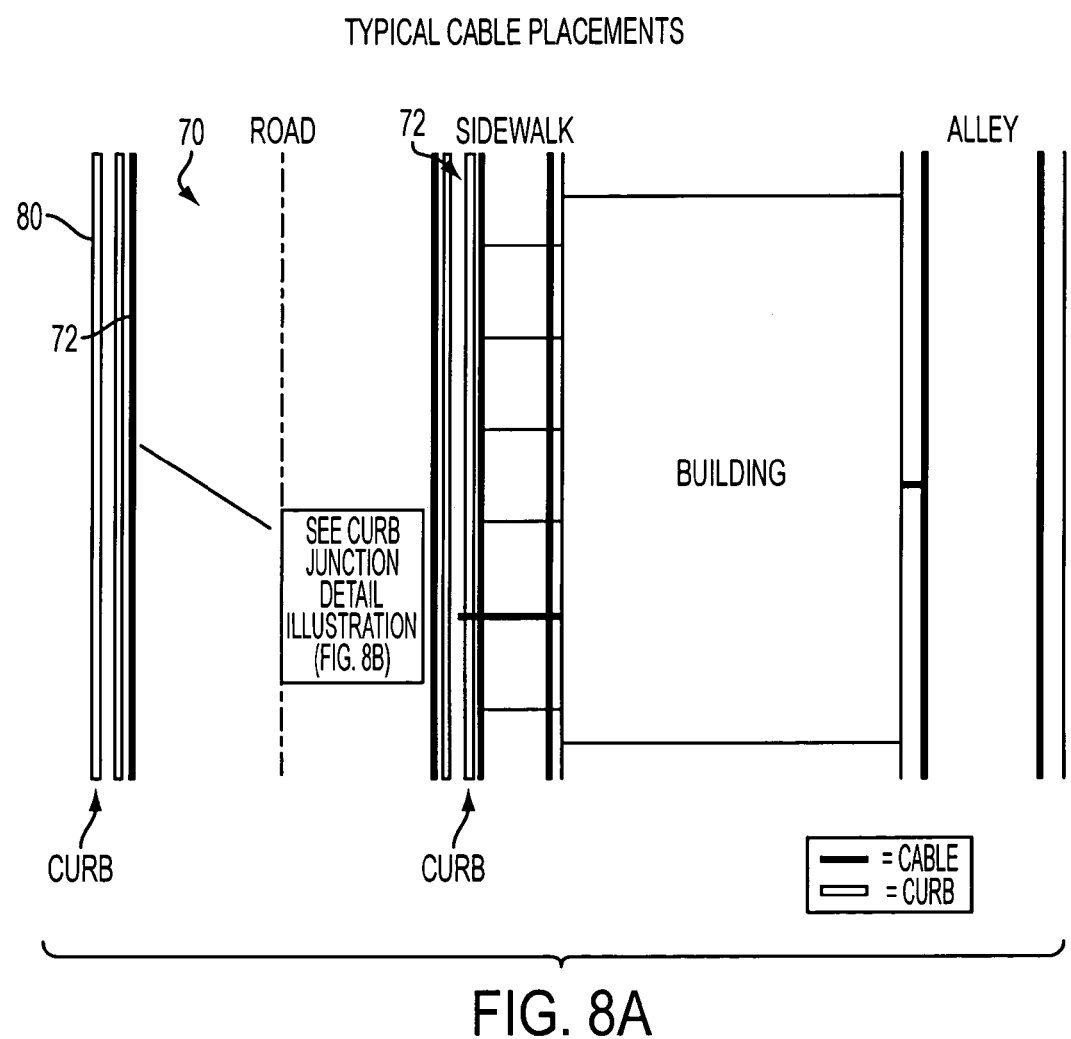
FIGS. 8A and 8B show a cable groove positioned at the curb junction between the pavement and the sidewalk.
Figure 8B:
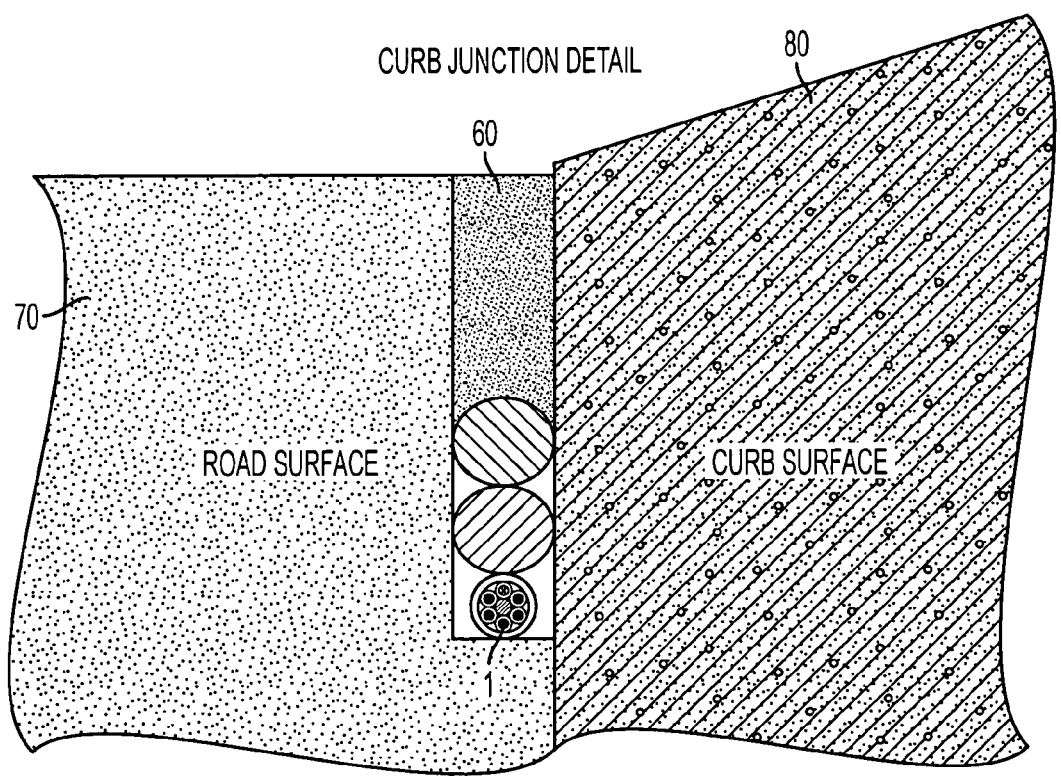

As shown in FIG. 8A, if the pavement 70 is a road pavement, then it is preferred that the groove 60 is provided at a position adjacent to the curb surface 80. FIG. 8B shows an embodiment in which a single groove 60 is provided at the junction 72 between the road pavement 70 and the curb surface 80. By providing a cable 1 at the junction 72 between the road pavement 70 and the curb surface 80, the cable can be easily installed. This junction is the strongest point of the road infrastructure and the preferred location from a highway engineering perspective.

Figure 9:
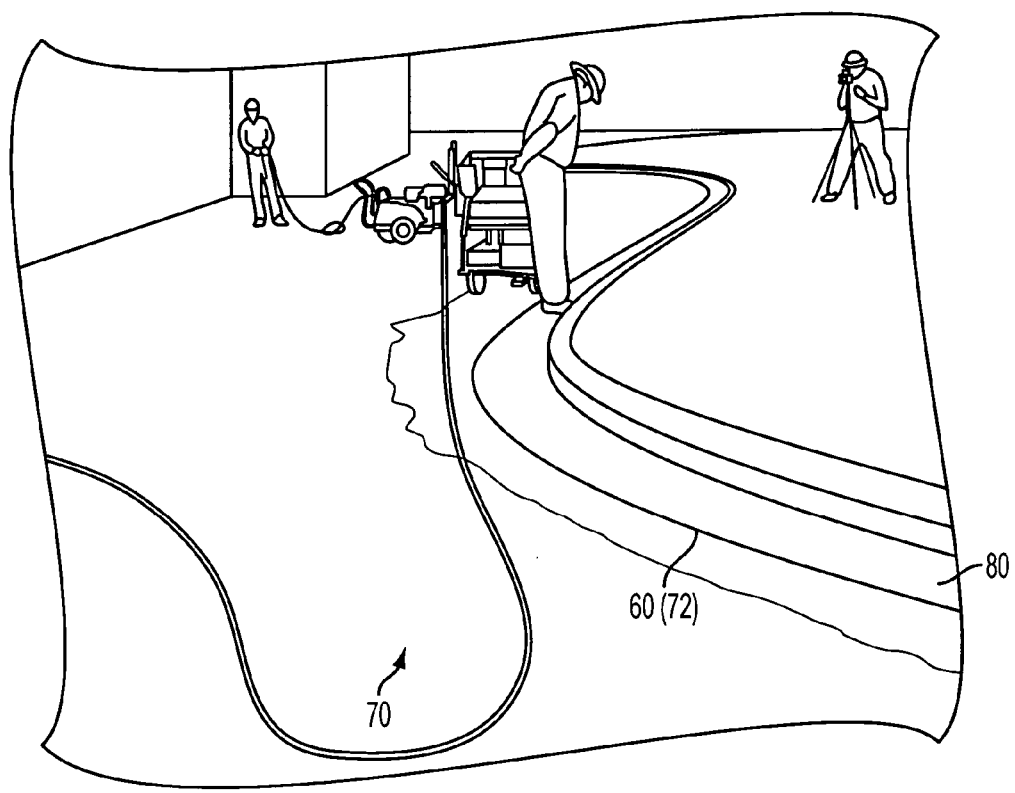
FIG. 9 shows the cable groove following the curvature of the road.

As shown in FIG. 9, the grooves are cut in a clean radius sweep of the pavement 70 at the junction 72 between the road pavement 70 and curb surface 80. This location of the cable groove 60 allows the cable to turn corners with the roadway and minimizes any cutting into the roadway's travel lanes, which can weaken the roadway structure.

Figure 10A:
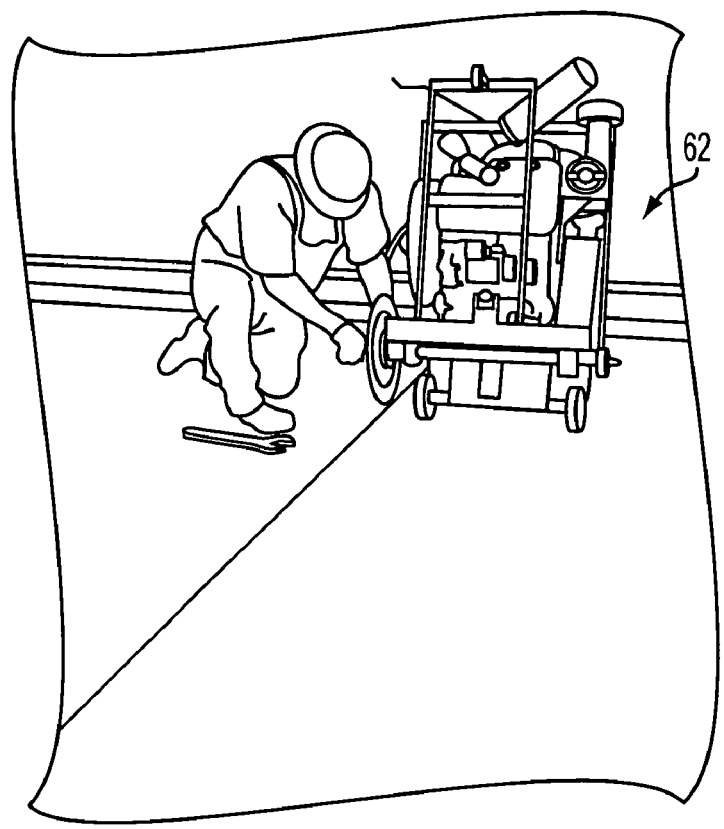
FIGS. 10A and 10B show a cutter that is used for cutting a groove within pavement.
Figure 10B:
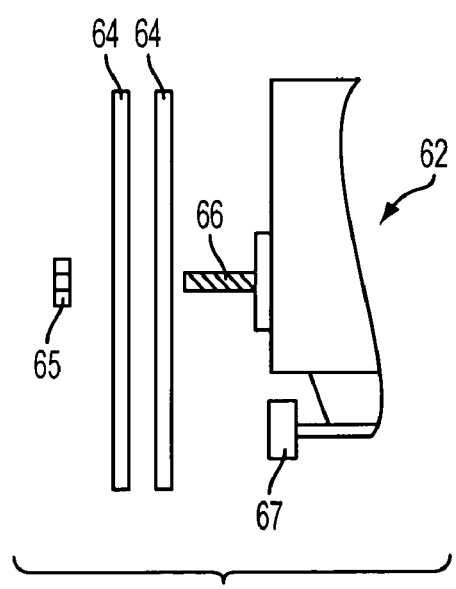

As shown in FIGS. 10A and 10B, a small, maneuverable cutter 62 having a single blade 64 or a combination of two blades 64 mounted next to each other is used to cut the grooves. The blades 64 of the cutter 62 are preferably diamond tipped, but the invention is not limited in this respect. The cutter 62 includes blades 64 fastened to a rotating impeller 66 by a fastening nut 65. Rolling wheels 67 allow the cutter to roll along the length of the cut groove 60.

Figure 11:
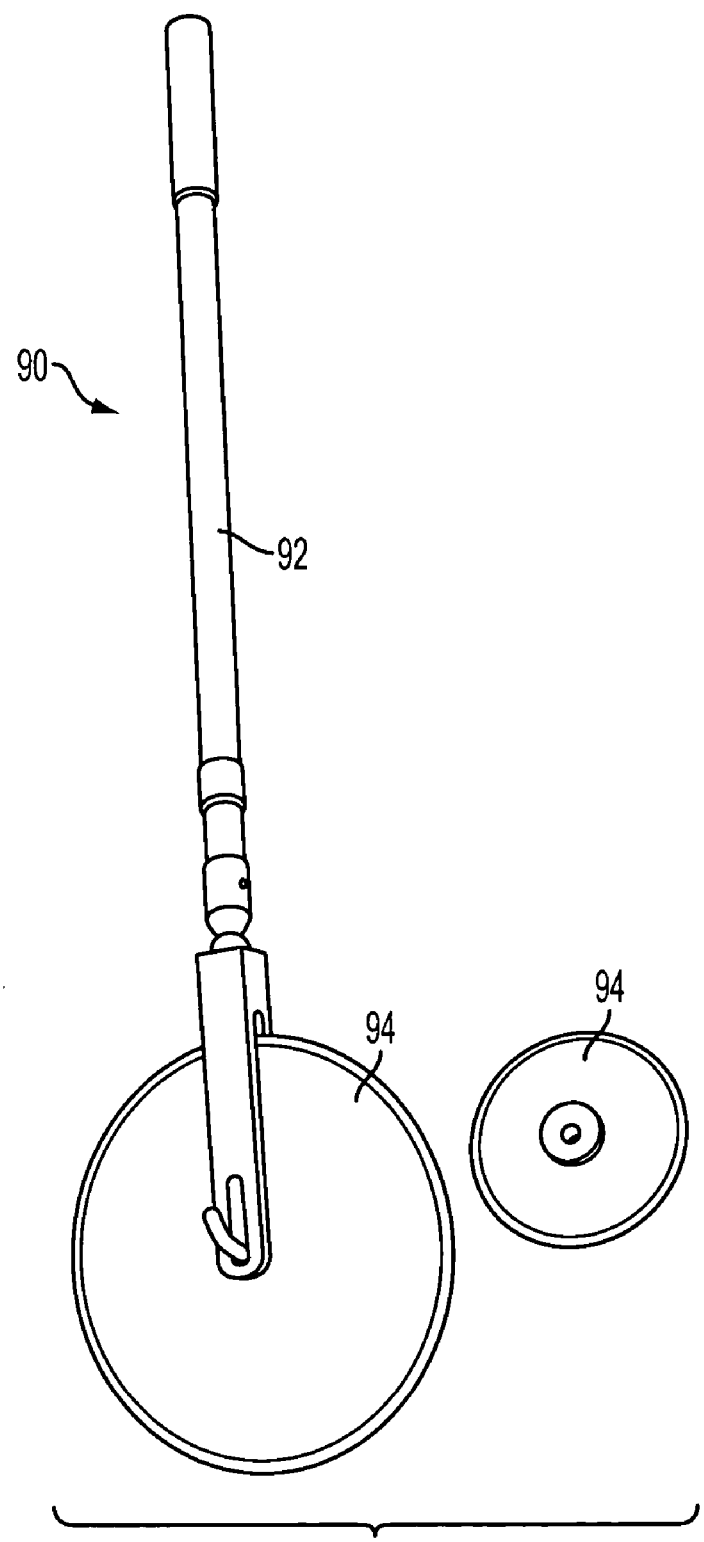
FIG. 11 shows a cable installation tool.

Next, as is shown in FIG. 11, the cable is positioned within the groove 60 using an installation insertion tool 90. The installation tool includes a handle 92 and roller 94 that positions the cable within the groove 60. The appropriate size of the roller 94 varies with the depth of the groove 60, i.e., a larger diameter roller is used if the groove 60 is deeper and a smaller diameter roller is used if the groove 60 is shallower.

Figure 12A:
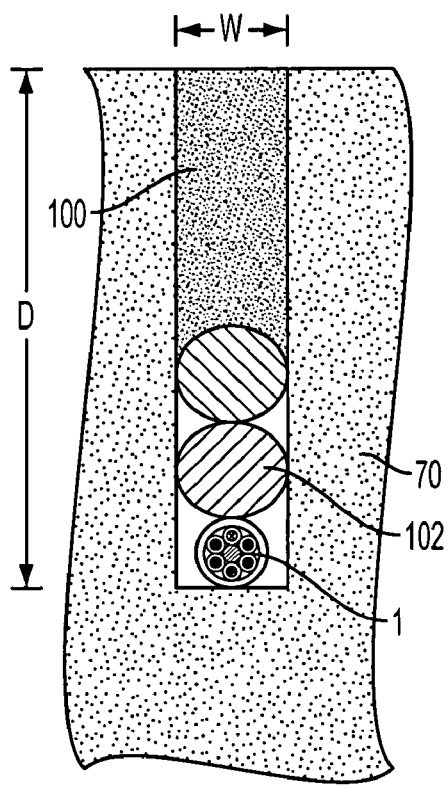
FIG. 12A shows a loose tube cable positioned within the groove of a road pavement.
Figure 12A:
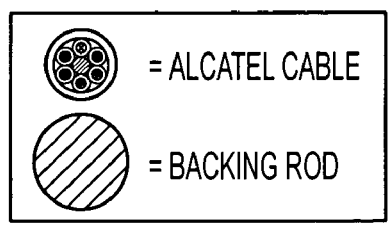
Figure 12B:
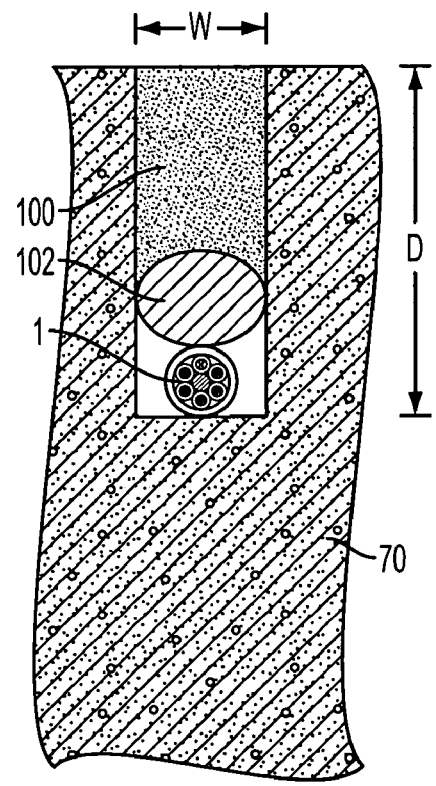
FIG. 12B shows a loose tube cable positioned within the groove of a sidewalk pavement.
Figure 12B:
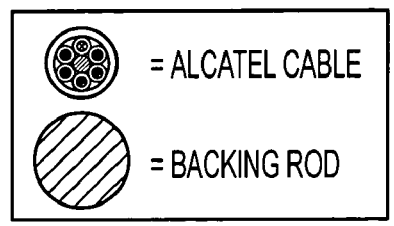
Figure 13A:
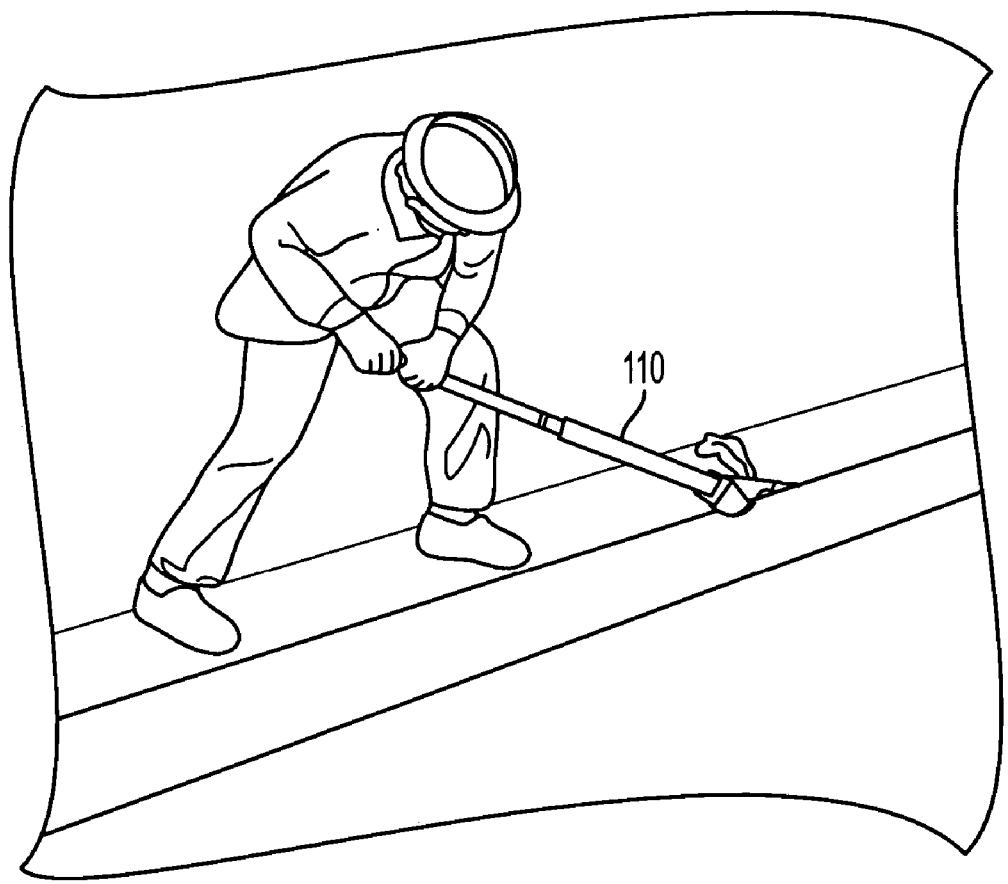
FIGS. 13A–13D show a sealant removal tool and the groove fill material using the sealant removal tool.
Figure 13B:
Figure 13C:
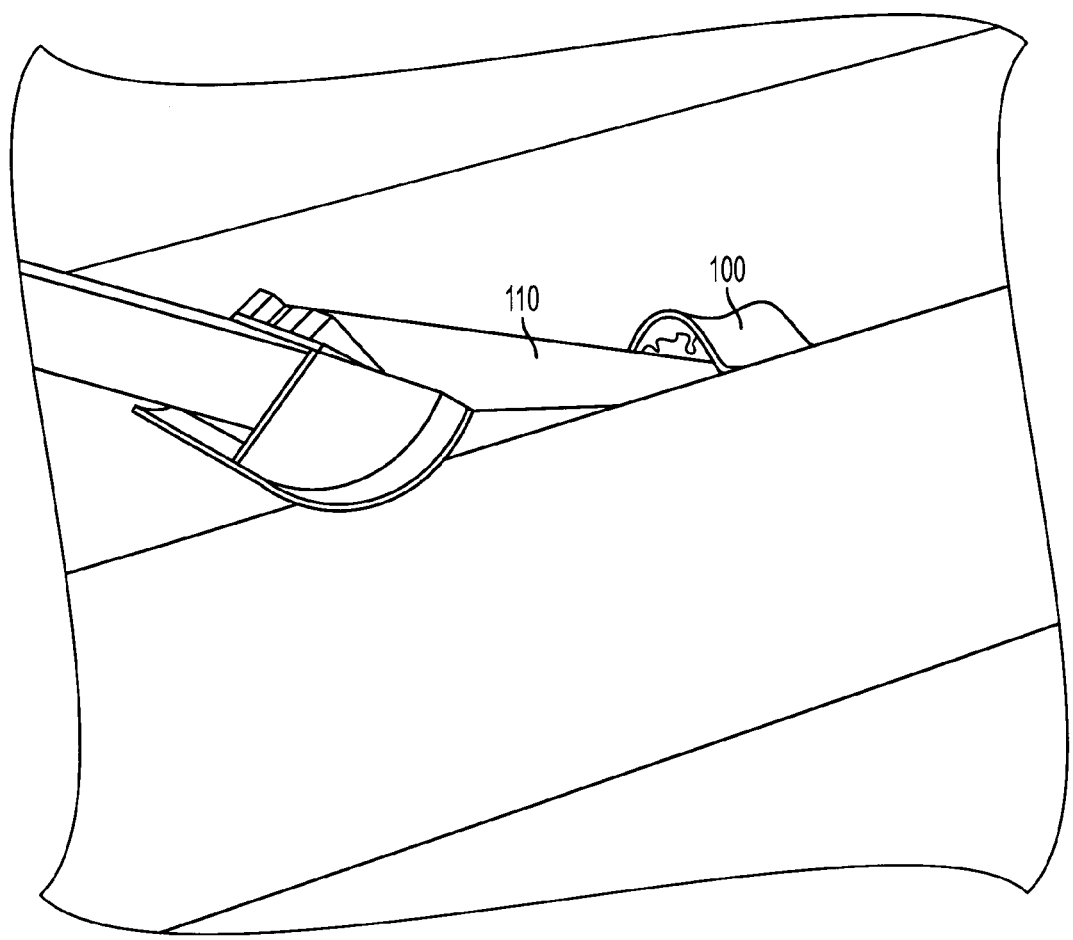
Figure 13D:
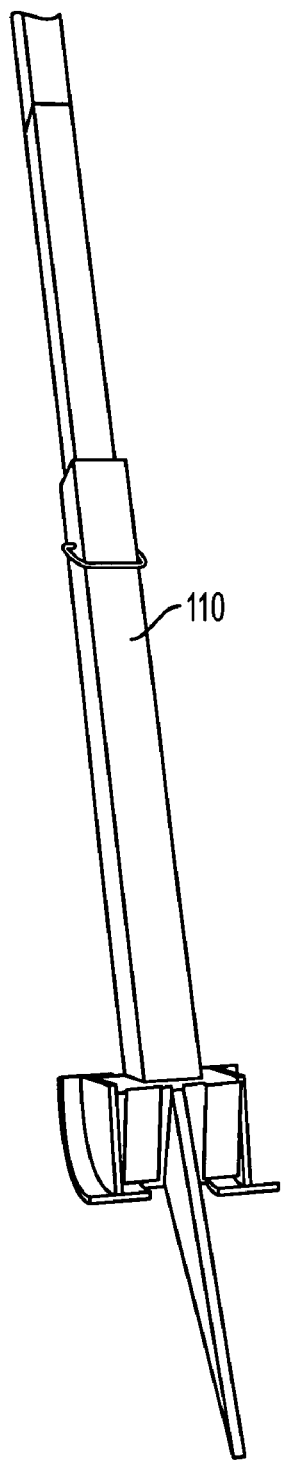

As shown in FIGS. 12A and 12B, the groove 60 is provided so that the groove extends vertically into but not through pavement 70. The groove width W is typically ½ inch or greater, but the invention is not limited in this respect. The preferred groove depth D is between 60 to 70% of the total thickness of the pavement. If the groove depth D is greater than 70% of the total thickness of the pavement 70, then the pavement can be weakened to potentially unacceptable strength levels. Typically, the groove depth D is 2 to 6 inches.

As shown in FIG. 12A, if the pavement 70 is a road pavement, the pavement can be can be blacktop, such as asphalt or concrete, but the invention is not limited in this respect. In addition, if the pavement 70 is a road surface that is likely to be subject to a milling and overlay procedure, the depth D of the groove should be deep enough so that the cable is below the foreseeable milling depth.

In addition, as shown in FIG. 12B, the groove 60 can also be cut into a sidewalk pavement. If the pavement 70 is a sidewalk pavement, the pavement can be cement, brick, or stone, but the invention is not limited in this respect. If the pavement is cement, brick, or stone, it is preferred that the depth D of the groove does not exceed 2 inches. The groove 60 can be cut directly into the sidewalk pavement, cut at the seams between the prefabricated sidewalk panels, occur at the sidewalk expansion joints, or cut between bricks of a brick sidewalk.

In addition, once the cable is provided within the groove 60 one or more backing rods 102 are provided on top of the cable. The backing rods 102 do not hold the cable in place, but instead provide a barrier that protects the cable from any filling material, or sealant, 100. Although the cable can withstand direct contact with the fill material 100 within a certain temperature tolerance, as discussed above with respect to Cable Resistance to Temperature, it is desirable that the cable is not in contact with the fill material 100. This provides a "floating" cable that is able to move somewhat, which is helpful if the there is street maintenance or if the depth D of the groove 60 changes.

The fill material 100 can be bitumen, silica, or loop detector fill, but the invention is not limited in this respect. Furthermore, if the pavement 70 is a sidewalk-pavement, it is preferred that the fill material 100 is silica, but again the invention is not limited in this respect and other materials such a bitumen can be used instead. It is preferred that the sealant depth is 1 to 2 inches.

As shown in FIGS. 13A–13D, after installation of the cable 1, it is easy to access the groove cable should that become necessary. The cable can be accessed by removing the fill material 100 using a sealant removal tool 110.

FIGS. 14A–E show cable maintenance loops 50 and groove loop sections 160. The maintenance loops 50 provide a cable slack, which enables quick restoration in the case the cable is cut. To repair the cut line, the cable is exposed and a section of extra cable is extended from one, or a number of maintenance loops, thus mitigating the need to completely replace the cable.

The loose tube cable 1 can be provided within the loop section 160 of the groove 60 because, as described above, the cable 1 is capable of bending to a very small radius without fracturing.

Figure 14A:
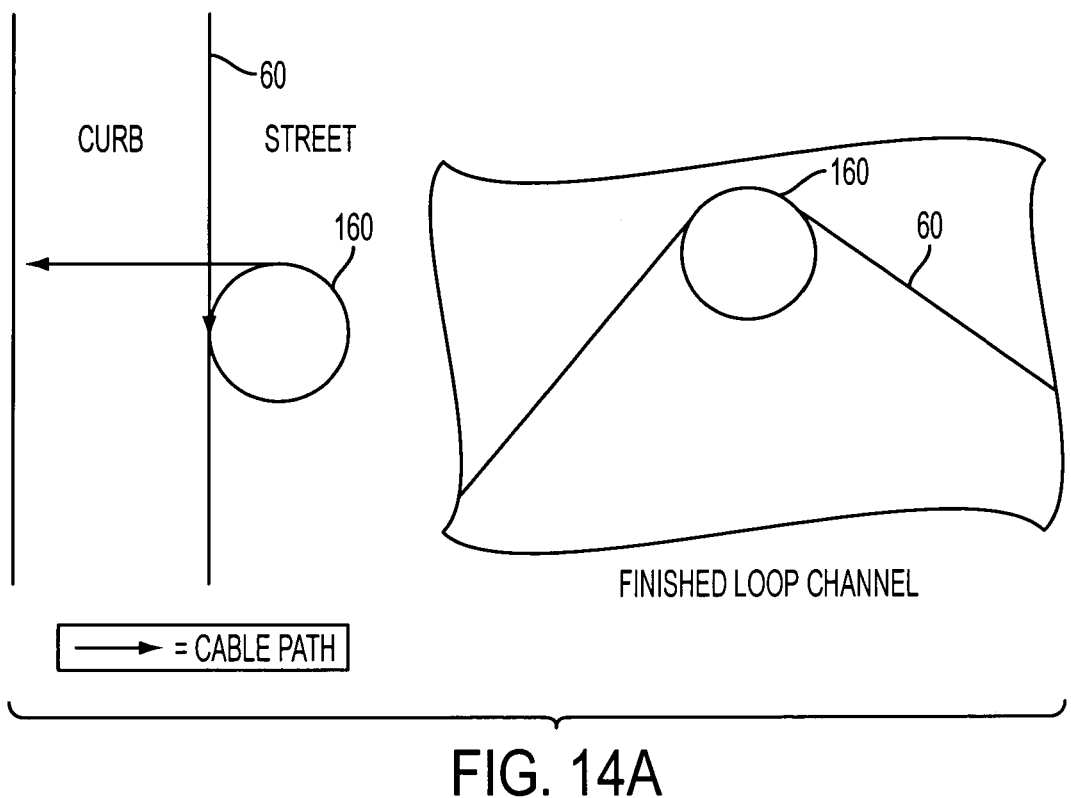
FIGS. 14A–E show cable maintenance loops and loop sections of the groove within which the maintenance loops are positioned.
Figure 14B:
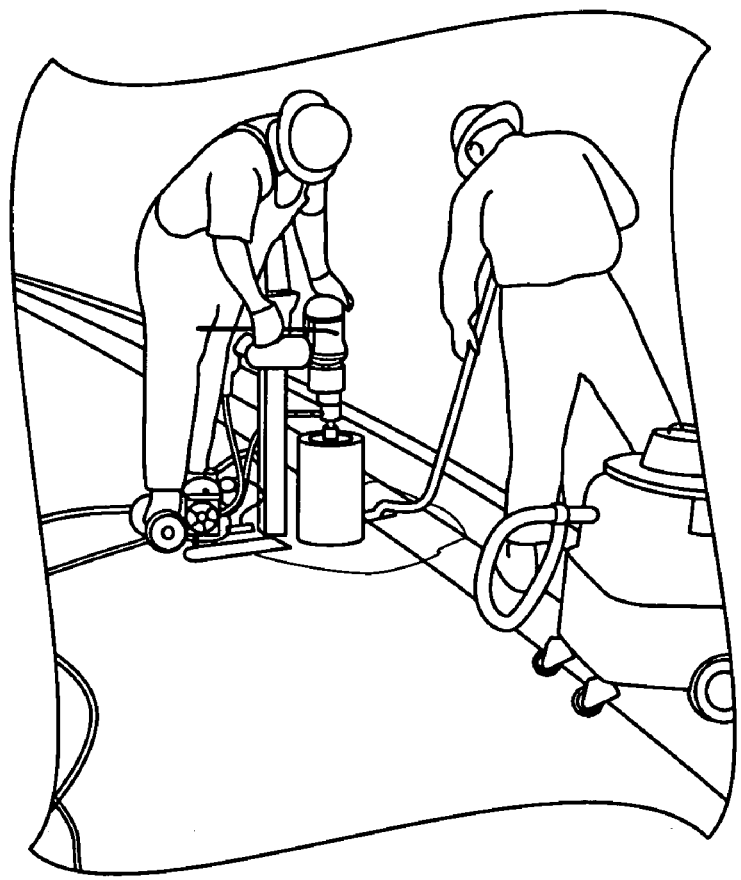
Figure 14C:
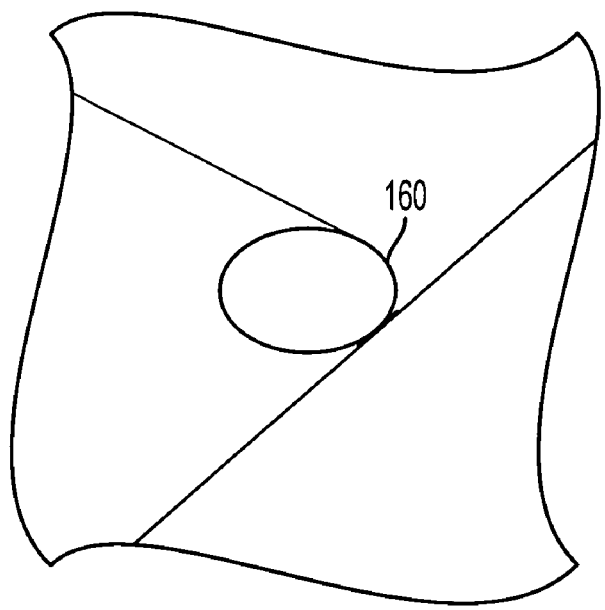
Figure 14D:
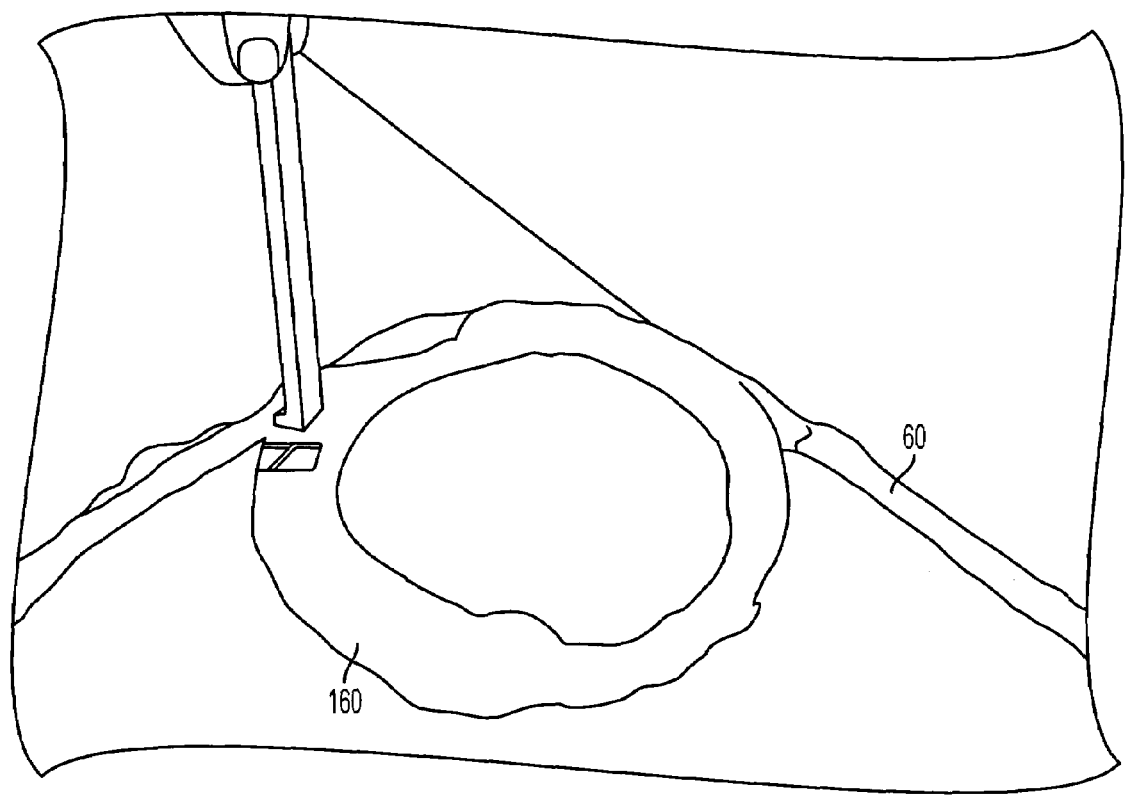
Figure 14E:
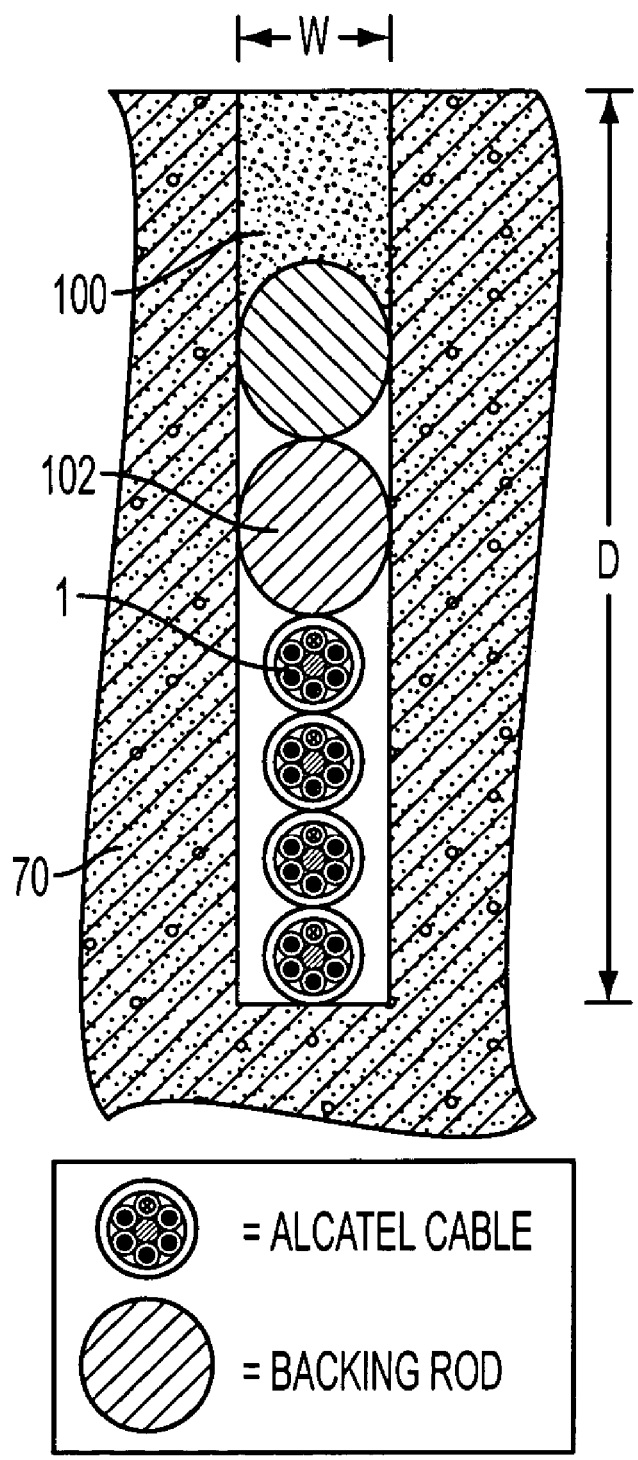

As shown in FIG. 14B, the cable 1 can be wound or looped multiple times within the loop section 160 of the groove 60. The amount of cable slack is dictated by the depth D of the groove 60. That is, deeper grooves 60 allow the cable 1 to loop within the groove loop 11. Therefore, it is preferred that the maintenance loop 50 is cored in deeper sections of pavement infrastructure to where a 6" to 8" depth can be supported without compromising the integrity of the paved surface. It is noted that it is preferred that the loop section 160 have the same width (0.5 inches for the embodiment shown in FIG. 14D) as the straight groove. As shown in FIG. 14E, at least one backing rod 102 and the filling material 100 are provided on top of the loops of the cable 1.

As shown in FIGS. 14B and C, these loop sections 160 are provided by coring the pavement 70 with a cylindrical cutter. The tested embodiment shown in FIG. 14C has a 10 inch diameter. This loop section 62 provides up to a meter of cable slack.

Figure 15:
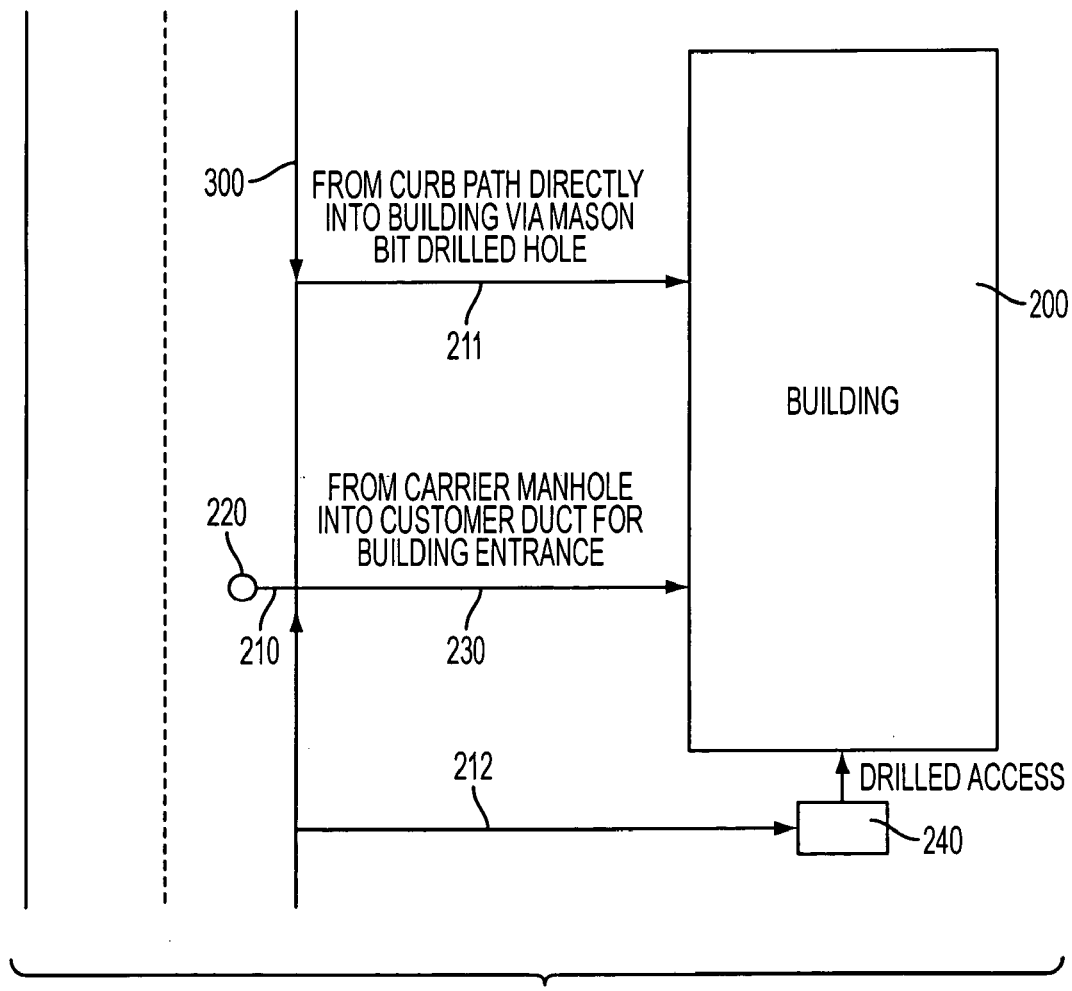
FIG. 15 shows fiber drops provide transmission lines to a building.

As shown in FIG. 15, the method can be used, for example, to provide fiber drops to one or more locations 200, such as a building.

Furthermore, the use of a loose tube cable 1 of the first embodiment allows one of the buffer tubes 10 to extend laterally from the main cable 300, providing a drop off 210 to the location 200, without having to sever and splice the other fibers in the cable. This drop off 210 can be interconnected to another fiber provider's cable at a location 220, such as a manhole, and then spliced into the building's 200 cable backbone 230 before crossing an easement onto private property. A drop off 211 can also be provided directly from the main cable 300 to the building 200 by drilling a path from the cable to the building 200. In addition, the drop off 212 can be first run to a slack or splice point 240, such as a fiber optic patch panel, and then run inside the building via a conduit. It is preferable that the slack or splice point 240 is within 50 feet of the building 200.

It is of course understood that departures can be made from the preferred embodiment of the invention by those of ordinary skill in the art without departing from the spirit and scope of the invention that is limited only by the following claims.

For example, the microduct of the second embodiment can be installed in a manner similar to the method of installing the loose tube cable discussed above. The microduct can be repaired by removing the sealant and backing rod from the groove, and then removing the microduct. The microduct is then reconnected with a shunt with the same inner diameter and slightly larger diameter than the duct being repaired. The repaired section can be reinserted into the groove and sealed with a cold patch sealant.

What is claimed is:

1. A cable system, comprising:
   a microduct;
   a microduct cable including at least one transmission element, the microduct cable provided within the microduct; and
   a pavement having a groove extending vertically into, but not through, the pavement;
   wherein the microduct is provided within the groove, and
   wherein said microduct has a thermal expansion force due to a change in temperature from 20° C. to 70° C. of less than or equal to 22 lbs when constrained.

2. The cable system of claim 1, wherein the pavement is a road pavement.

3. The cable system of claim 1, wherein the pavement is a sidewalk pavement.

4. The cable system of claim 1, further comprising a curb surface, wherein said groove is positioned at a curb junction adjacent to the curb surface.

5. The cable system of claim 1, wherein said groove extends 70% or less of an overall depth of the pavement.

6. The cable system of claim 5, wherein said groove extends 60% or less of the overall depth of the pavement.

7. The cable system of claim 1, wherein said groove includes a loop section, and wherein said cable extends around the groove of the loop section.

8. The cable system of claim 1, further comprising at least one backing rod provided within said groove on top of said cable.

9. The cable system of claim 8, further comprising a filler material provided within said groove on top of said at least one backing rod.

10. The cable system of claim 1, wherein said at least one transmission element is an optical fiber.

11. The cable system of claim 1, wherein said microduct cable has a thermal expansion force due to a change in temperature from 20° C. to 70° C. of less than or equal to 17 lbs when constrained.

12. The cable system of claim 1, wherein said microduct has a melt temperature above 180° C.

13. The cable system of claim 12, wherein said microduct has a melt temperature above 200° C.

14. The cable system of claim 1, wherein said microduct cable has a linear expansion due to a change in temperature from 20° C. to 70° C. with respect to an 800 ft. run length of 0.3 ft or less.

* * * * *